United States Patent
Su et al.

(10) Patent No.: US 7,181,213 B2
(45) Date of Patent: Feb. 20, 2007

(54) WIRELESS NETWORK SERVICE PROVIDER AND ASSOCIATED CHANNEL-SEARCHING METHOD

(75) Inventors: Wei-Kun Su, Taipei (TW); Shih-Huang Ou Yang, Taipei (TW)

(73) Assignee: Micro-Star Int'l. Co., Ltd., Taipei Hsien (TW)

( * ) Notice: Subject to any disclaimer, the term of this patent is extended or adjusted under 35 U.S.C. 154(b) by 60 days.

(21) Appl. No.: 10/895,041

(22) Filed: Jul. 21, 2004

(65) Prior Publication Data

US 2005/0227623 A1    Oct. 13, 2005

(30) Foreign Application Priority Data

Mar. 19, 2004    (TW) .............................. 93107372 A

(51) Int. Cl.
*H04Q 7/20*    (2006.01)

(52) U.S. Cl. ................. 455/434; 455/67.13; 455/226.3

(58) Field of Classification Search ............. 455/67.11, 455/67.13, 115.1, 115.3, 226.1, 226.2, 226.3, 455/434

See application file for complete search history.

(56) References Cited

U.S. PATENT DOCUMENTS 6,895,245 B2 * 5/2005 Wallentin ................... 455/436
6,982,962 B1 * 1/2006 Lunsford et al. ........... 370/278
2003/0119452 A1 * 6/2003 Kim et al. .................... 455/69

* cited by examiner

Primary Examiner—Temica Beamer
(74) Attorney, Agent, or Firm—Troxell Law Office, PLLC

(57) ABSTRACT

An wireless network service provider such as access point (AP) and wireless gateway, and relating channel-searching method is disclosed. The wireless network service provider receives a signal strength information and a channel-influence information from the other wireless network service provider, and selects the best channel based on the signal-strength information and the channel-influence information. The method comprises the following steps: providing the station with a signal-strength information and a channel-influence information from the other wireless network service provider, generating a interference information based on the signal-strength information and the channel-influence information by the wireless network service provider, and selecting the best channel of the wireless network service provider according to the interference information. Thus, the best channel can be chosen to be used for improving the efficiency in the wireless network.

15 Claims, 4 Drawing Sheets

WIRELESS NETWORK SERVICE PROVIDER AND ASSOCIATED CHANNEL-SEARCHING METHOD

FIELD OF THE INVENTION

The present invention relates to a wireless network service provider and associated channel-searching method, and more particularly, to a wireless network service provider and associated channel-searching method capable of detecting an optimum channel.

BACKGROUND OF THE INVENTION

Wireless communications are becoming increasingly popular in today's fast paced world. Mobility and portability provided by the wireless technology are the merits that the conventional wired network does not have. In addition, the cost of setting up an infrastructure of wireless network is cheaper than that of a wired network, since a significant amount of layout cost can be saved. Moreover, the flexibility of wireless network is much better than that of a conventional wired network, since the wireless network can be setup easily at the location where is difficult to layout substantial cables for wired network. The cable required in a wired network for forming a physical contact between a transmitter and a receiver can be damaged due to aging, environmental influence or even insect/rat bits that generally requires the administrator of the wired network to spend a considerable amount of time for locating the problamatic cable and replacing it. On the other hand, the wireless network is free from the foregoing problem of the wired network. Any forms of electromagnetic radiation can be used as the transmission medium of a wireless network, such as infrared, radio, etc. However, infrared can be blocked by wall or by other solid object such that radio is the most common transmission medium used in wireless networks.

According to IEEE 802.11 specification, the operating bandwidth of 802.11a is between 5.18~5.805 GHz, and the bandwidth for both the 802.11b and 802.11g specification is between 2.402~2.483 GHz, which is the generally referred as Industrial, Scientific and Medical band (ISM). For example, currently in Taiwan, there are only 11 channels available for wireless network service provider, such as wireless access point, that is, in Taiwan it only provides three channels free from inter-interference in 802.11b specification, which are channel 1, 6 and 11. If there are more than three wireless network service providers, in a same area all using 802.11b specification, the fourth provider is going to suffer radio interference no matter which channel it choose to operate. For instance, when channel 6 is occupied by an access point and the same time that another access point also choose to use channel 6, the overall efficiency of the wireless network is not going to equal two times the efficiency of only one access point in the network, such as just 1.3 times the efficiency of one access point or even worse. The only method of preventing the above problem is by directing the new access point added in the wireless network to use a channel other than channel 6. However, the more person use the wireless network, the more access point is required. In this regard, radio interference between access points is inevitable and has to be prevented since there are only three channels that are fully separated from each other and are not going to interference with one another. Presently, there's no channel-searching method capable of automatically detecting an appropriate channel such that most users of wireless network do not know how to set up an operating channel. In view of the above description, the present invention provides a channel-searching method for wireless network service providers capable of detecting an optimum channel.

SUMMARY OF THE INVENTION

The primary object of the invention is to provide a wireless network service provider and associated channel-searching method, capable of detecting an optimum channel to be established as the operating channel of the wireless network service provider automatically.

Another object of the invention is to provide a wireless network service provider and associated channel-searching method, capable of detecting an optimum channel and providing the optimum channel to a user of the wireless network service provider for establish the same as the operating channel of the wireless network service provider.

The wireless network service provider of the present invention is in a wireless network having at least a second wireless network service provider and is capable of searching available operating channel automatically. The wireless network service provider comprises a transmitting unit, a receiving unit and a processing. The transmitting unit is capable of transmitting a signal to the second wireless network service provider for directing the second wireless network service provider to generate a signal-strength information and a channel-influence information. The receiving unit is used for receiving the signal-strength information and the channel-influence information of the second wireless network service provider. The processing unit uses a first calculation means to generate an interference information according to the signal strength information and the channel-influence information and further determining the operating channel for the wireless network service provider according to the interference information.

The channel-searching method of the present invention, which is used in a wireless network having a first wireless network service provider and at least a second wireless network service provider, comprises the steps of:

providing the first wireless network service provider with a signal-strength information and a channel-influence information of each the second wireless network service provider;

generating an interference information based on the signal-strength information and the channel-influence information of each the second wireless network service provider by the first wireless network service provider; and selecting the optimum channel for the first wireless network service provider according to the interference information.

For your esteemed members of reviewing committee to further understand and recognize the fulfilled functions and structural characteristics of the invention, several preferable embodiments cooperating with detailed description are presented as the follows.

DESCRIPTION OF THE PREFERRED EMBODIMENT

Figure 1:
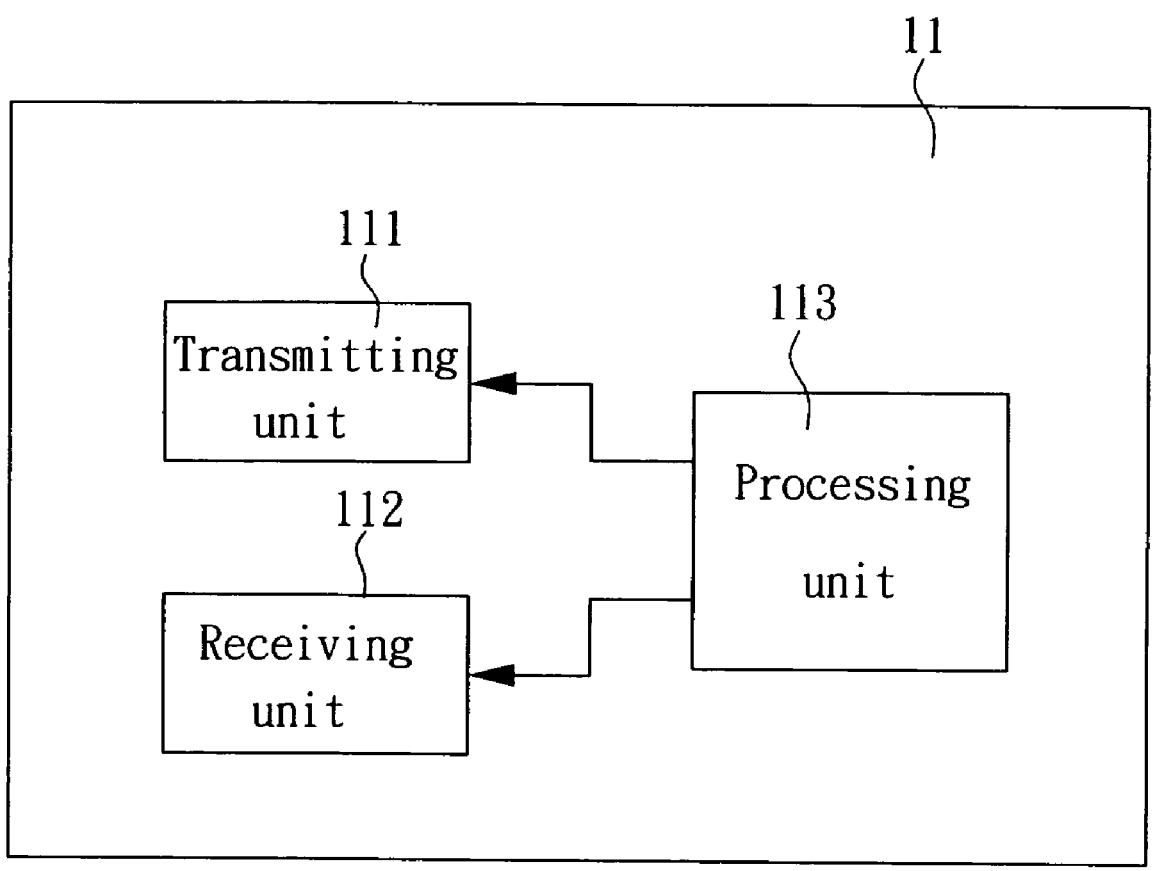
FIG. 1 is a block diagram of a wireless network service provider according to a preferred embodiment of the present invention.
Figure 2:
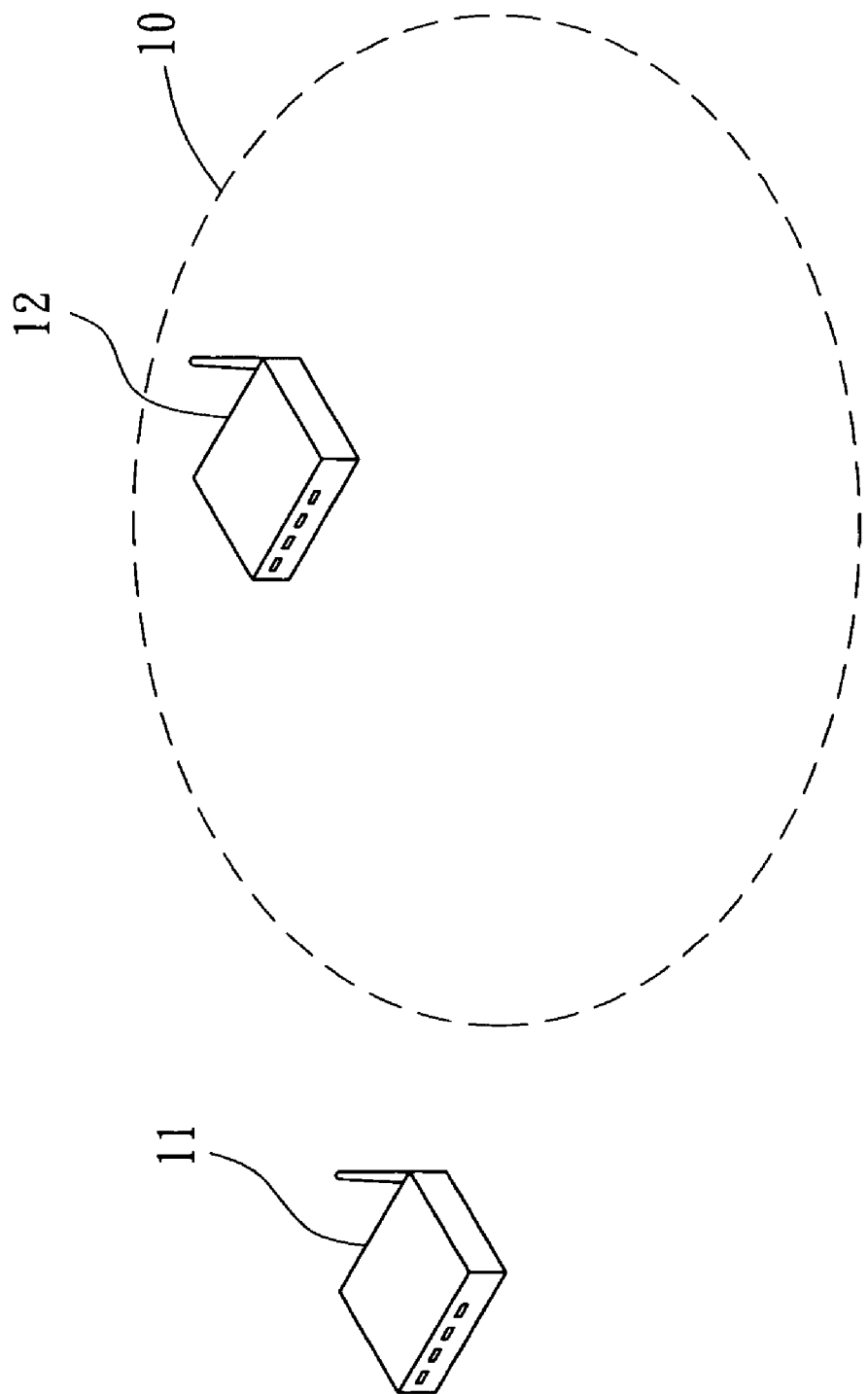
FIG. 2 is a diagram showing a preferred wireless network of the present invention.

Please refer to FIG. 2, which is a diagram showing a preferred wireless network adopting a wireless network service provider and associated channel-searching method of the present invention. The wireless network service provider is connected to a computer (not shown), and is capable of wireless-to-wired bridging capability. The wireless network 10 comprises a second wireless network service provider 12 operated on a channel 1 whose center frequency is 2.412 GHz according to IEEE 802.11 specification. When a first wireless network service provider 11 comprising a transmitting unit 111, a receiving unit 112 and a processing unit 113 (shown in FIG. 1) is required by a user to join the wireless network 10, the transmitting unit will issue a first signal to the wireless network 10 and the first signal can be a frame such as a probe request frame, and thus the second wireless network service provider will responsively issue a second signal, such as a probe response or any other frame information, to the receiving unit 112 after receiving the first signal and the second signal and then the second signal will be forwarded to the processing unit 113 so that the processing unit 113 will proceed the second signal and generate a signal-strength information, such as received signal strength indication (RSSI) or the energy of a signal received from the second wireless network service provider, and a channel-influence information of the second wireless network service provider 12 basing on the received second signal. In a preferred embodiment of the present invention, the first wireless network service provider 11 can be a passive access point that without issuing the first signal, just "listen" the frames transmitted from the wireless network of the intended area so as to acquire the required second signal and then forward the acquired second signal to the processing unit 113. The processing unit can determine the amount of wireless network service providers existed in the intended area and detect the associated information of the wireless network service providers basing on the received signal frames.

The channel-influence information indicates the influence of the second wireless network service provider 12 upon each channel, i.e. from channel 1 to channel 11, and can be calculated using a first formula, i.e. influence ratio=(22−5×N)/22, where N represents the number difference between any two channels. In this regard, the influence of the second wireless network service provider 12 upon channel 1 is 100%, and the influence of the second wireless network service provider 12 upon channel 2 is 77.3%, and the influence upon channel 3 is 54.3%, the influence upon channel 4 is 31.8%, the influence upon channel 5 is 9.1% and the influence upon channel 6 is 0%. The first wireless network service provider 11 will analyze all the influence ratios of the channel-influence information and the RSSI to generate interference information for each channel, that the interference information of each channel is generated by multiplying the RSSI with the channel-influence information of each channel. Accordingly, the interference information of channel 1 to channel 11 can be acquired and compared. Therefore, the channel with smallest value of interference information should be the optimum channel, and the processing unit 113 of the first wireless network service provider 11 can either set the optimum channel as the operating channel thereof, or show the information of the optimum channel on the computer monitor for reference such that a user can decide whether or not to select the optimum channel as the operating channel. On the other hand, any hand-held instrument, such as Spectrum Analyzer, can be used to measure the signal strength of the second wireless network service provider 12 in the wireless network 10 and use the same as indicator of posterior processing.

Figure 3:
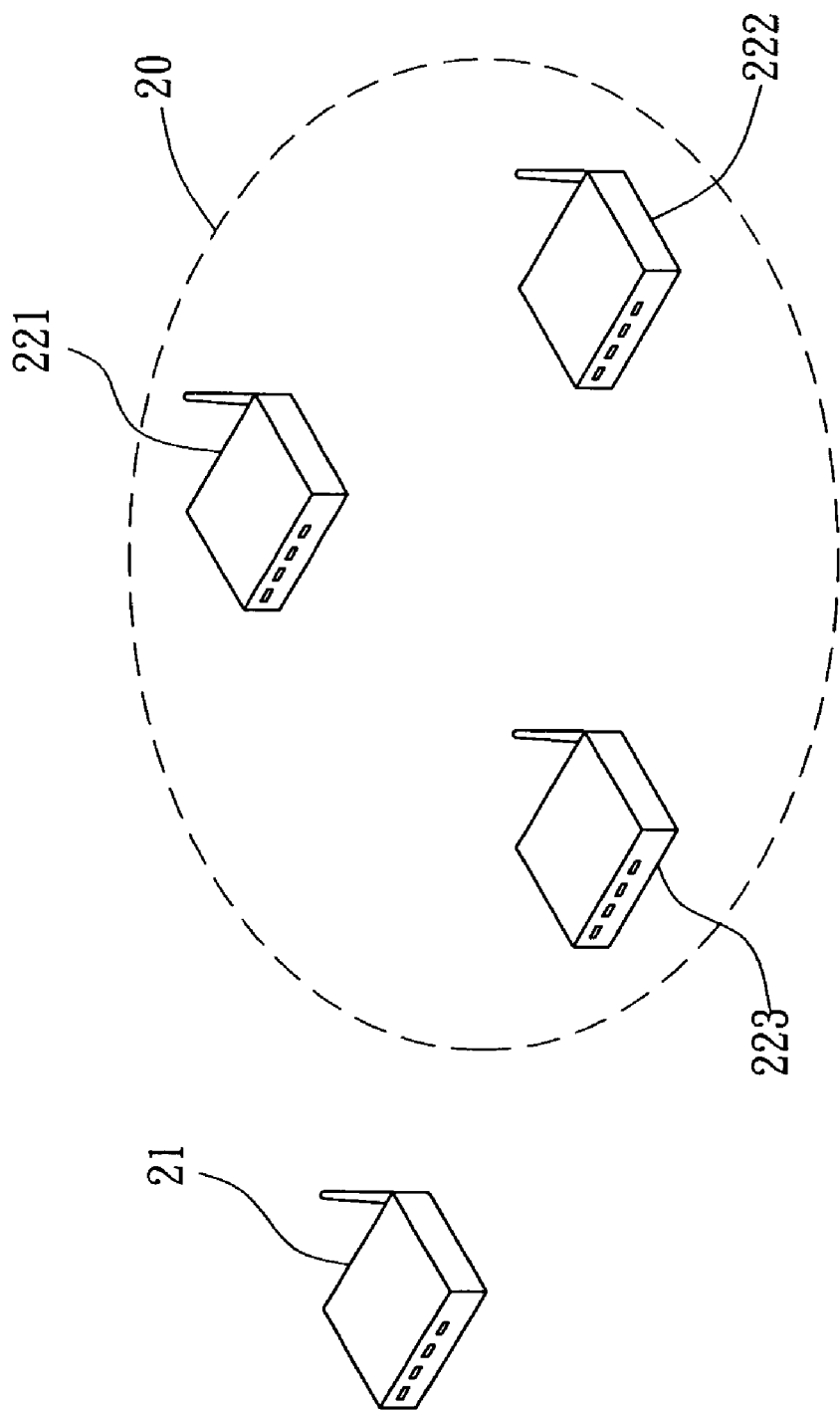
FIG. 3 is a block diagram of a wireless network service provider according to another preferred embodiment of the present invention

Please refer to FIG. 3, which is another preferred embodiment of the present invention. The wireless network 20 can comprise a plurality of second wireless network service providers. In this embodiment, the wireless network 20 has three second wireless network service providers 221, 222, 223, which are operating under different channel without interfering with each other. For example, the wireless network service providers 221 uses the channel 1, the wireless network service providers 222 uses the channel 6 and the wireless network service providers 223 uses the channel 11. According to the IEEE 802.11 specification, the center frequency of channel 1 is 2.412 GHz, the center frequency of channel 6 is 2.437 GHz and the center frequency of channel 11 is 2.462 GHz. If it is required to add another wireless network service provider, i.e. a first wireless network service provider 21, to the wireless network 20, it is going to have influence on the three existing wireless network service providers 221, 222, 223 since there are only 3 mutually interference-free channels according to the IEEE 802.11b specification. In this regard, which channel that the first wireless network service provider 21 is going to use is essential to the performance of the wireless network 20.

When a first wireless network service provider 21 is required by a user to join the wireless network 20, the first wireless network service provider 21 will issue a first signal to the wireless network 20 and the first signal can be a frame, such as a probe request, and thus the second wireless network service provider 221, 222, 223 will responsively issue a second signal, such as a probe response, to be received by the first wireless network service provider 21 in respective after receiving the first signal. Next, the first wireless network service provider 21 will gather those second signals so as to generate signal-strength information, such as a received signal strength indication (RSSI) or the energy of a signal received from the second wireless network service provider, and a channel-influence information for each second wireless network service provider, that is the providers 221, 222, 223, basing on the received second signal. In a preferred embodiment of the present invention, the first wireless network service provider 21 can be a passive access point that without issuing the first signal, just "listen" the signal frames transmitted from the wireless network of the intended area so as to acquire the required second signal. The first wireless network service provider 21 can gather the channel-influence information and RSSIs from all three second service providers 221, 222, 223, and generate three set of interference information of every channel for each second service providers 221, 222, 223 independently. Therefore, the channel with the smallest value of interference information should be the optimum channel, and the first wireless network service provider 1 can set the optimum channel as the operating channel thereof. In a preferred embodiment, the first wireless network service provider 1 is capable of summarizing all interference information of each second wireless network service provider and selecting a channel with the least total interference as the operating channel thereof. The first wireless network service provider 11 can either automatically set the optimum channel as the operating channel thereof, or just show the information of the optimum channel on the computer monitor for reference such that a user can decide whether or not to select the optimum channel as the operating channel.

Figure 4:
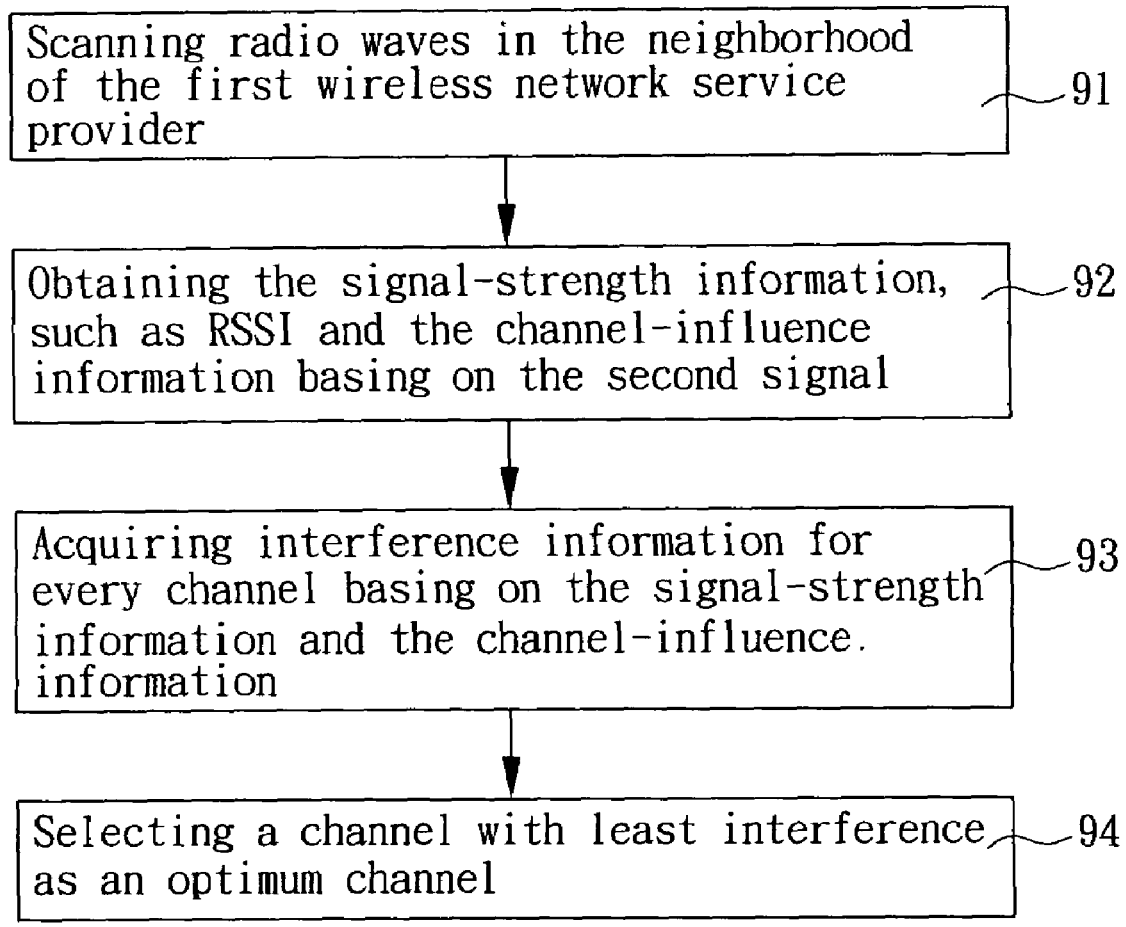
FIG. 4 is a flow chart illustrating the channel-searching method of the present invention.

Please refer to FIG. 4, which is a flow chart showing a channel-searching method of the present invention. The channel-searching method comprises the steps of:

Step 91: Scanning radio waves in the neighborhood of the first wireless network service provider 11. Any signal frame transmitted from the second wireless network service provider 12 can be employed as a second signal. In a preferred embodiment, the first wireless network service provider 11 may issue a first signal to request the second wireless network service provider 12 for issuing the second signal in response.

Step 92: Obtaining the signal-strength information, such as RSSI or the energy of a signal received from the second wireless network service provider, and the channel-influence information basing on the second signal.

Step 93: Acquiring interference information for every channel basing on the signal-strength information and the channel-influence information. The calculating formula is as aforementioned without further description hereinafter.

Step 94: Selecting a channel with least interference as an optimum channel.

Wherein, after step 94, the channel-searching method can either automatically set the optimum channel as the operating channel of the first wireless service provider 11, or provide the optimum channel as reference for a user to determine the operating channel manually.

While the preferred embodiment of the invention has been set forth for the purpose of disclosure, modifications of the disclosed embodiment of the invention as well as other embodiments thereof may occur to those skilled in the art. Accordingly, the appended claims are intended to cover all embodiments which do not depart from the spirit and scope of the invention.

What is claimed is:

1. A channel-searching method used in a wireless network having a first wireless network service provider and at least one second wireless network service provider, comprising the steps of:

providing the first wireless network service provider with both a signal-strength information and a channel-influence information resulting from each of the at least one second wireless network service provider;

generating an interference information based on the signal-strength information and the channel-influence information from the at least one second wireless network service provider by the first wireless network service provider; and selecting an optimum channel as an operating channel for the first wireless network service provider according to the interference information, wherein the channel-influence information is the influence ratio representing the influence of the at least one second wireless network provider upon each channel, the influence ratio being determined by the formula:

influence ratio=$(22-5\times N)/22$, where N represents the difference between the channel numbers of any two channels.

2. The method as recited in claim 1, wherein the signal-strength information is a received signal strength indication.

3. The method as recited in claim 1, wherein the signal-strength information is the energy of a signal received from the at least one second wireless network service provider.

4. The method as recited in claim 1, wherein the interference information is acquired by multiplying the signal-strength information with the channel-influence information, wherein is the interference information represents the interference level which the designated at least one second wireless network service provider exerts upon each channel.

5. The method as recited in claim 1, wherein the first wireless network service provider is capable of summarizing all interference information from each of the at least one second wireless network service provider and selecting a channel with the least total interference as the optimum channel.

6. The method as recited in claim 1, wherein the optimum channel is automatically selected by the first wireless network service provider while the first wireless network service provider joins the wireless network.

7. The method as recited in claim 1, wherein the operating channel of the first wireless network service provider is selectable by a user.

8. A wireless network service provider, capable of automatically searching available channels as a operating channel thereof while being added to a wireless network having at least one second wireless network service provider, the wireless network service provider comprising:

a receiving unit, being used for receiving both a signal-strength information and a channel-influence information resulting from the at least one second wireless network service provider;

a processing unit, connected to the receiving unit and capable of using a first calculation means to generate an interference information according to the signal strength information and the channel-influence information and further selecting the operating channel for the wireless network service provider according to the interference information, wherein the channel-influence information is the influence ratio representing the influence of the at least one second wireless network provider upon each channel, the influence ratio being determined by the formula:

influence ratio=$(22-5\times N)/22$, where N represents the difference between the channel numbers of any two channels.

9. The wireless network service provider as recited in claim 8, wherein the wireless network service provider further comprises a transmitting unit, capable of transmitting a signal to the wireless network for directing the at least one second wireless network service provider to generate the signal-strength information and the channel-influence information.

10. The wireless network service provider as recited in claim 8, wherein the signal-strength information is a received signal strength indication.

11. The wireless network service provider as recited in claim 8, wherein the signal-strength information is the energy of a signal received from the at least one second wireless network service provider.

12. The wireless network service provider as recited in claim 8, wherein the first calculation means is described as following: multiplying the channel-influence information with the signal-strength information, for generating the interference information.

13. The wireless network service provider as recited in claim 8, wherein the wireless network service provider is capable of summarizing all interference information of the at least one second wireless network service provider and selecting a channel with the least total interference as the operating channel.

14. The wireless network service provider as recited in claim 8, wherein the operating channel is automatically selected by the wireless network service provider while the wireless network service provider joins the wireless network.

15. The wireless network service provider as recited in claim 8, wherein the operating channel of the wireless network service provider is selectable by a user.

* * * * *